United States Patent
Jeong et al.

(10) Patent No.: US 10,598,091 B2
(45) Date of Patent: Mar. 24, 2020

(54) SYSTEM AND METHOD FOR PREVENTING SEIZURE OF BEARING USING KNOCKING SENSOR

(71) Applicants: HYUNDAI MOTOR COMPANY, Seoul (KR); KIA MOTORS CORPORATION, Seoul (KR)

(72) Inventors: Jaekyoung Jeong, Seoul (KR); Ha-Dong Bong, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 5 days.

(21) Appl. No.: 16/144,490

(22) Filed: Sep. 27, 2018

(65) Prior Publication Data
US 2020/0063668 A1    Feb. 27, 2020

(30) Foreign Application Priority Data

Aug. 27, 2018 (KR) .......................... 10-2018-0100513

(51) Int. Cl.
  *F02B 77/08*    (2006.01)
  *F02D 35/02*    (2006.01)
  *G01M 13/045*   (2019.01)
  *F02D 41/22*    (2006.01)
  *F01M 11/10*    (2006.01)

(52) U.S. Cl.
  CPC .......... *F02B 77/085* (2013.01); *F02D 35/027* (2013.01); *F02D 41/22* (2013.01); *G01M 13/045* (2013.01); *F01M 2011/14* (2013.01)

(58) Field of Classification Search
  CPC . F01M 2011/14; F02B 77/085; F02D 35/027; F02D 41/22; G01M 13/045
  See application file for complete search history.

(56) References Cited

U.S. PATENT DOCUMENTS

| 5,528,928 | A  | * | 6/1996  | Baker   | G01M 15/042 |
|           |    |   |         |         | 361/290     |
| 2011/0224922 | A1 | * | 9/2011  | Kirillov | G01M 15/12 |
|           |    |   |         |         | 702/56      |
| 2016/0195029 | A1 | * | 7/2016  | Bizub   | F02D 35/027 |
|           |    |   |         |         | 73/35.03    |
| 2016/0312716 | A1 | * | 10/2016 | Bizub   | G01L 23/221 |

(Continued)

FOREIGN PATENT DOCUMENTS

DE      4308796 A1 * 9/1994 ............... G01H 1/14
KR  10-2010-0062421 A  6/2010

OTHER PUBLICATIONS

Kesler, DE4308796, machine translation (Year: 1994).*

*Primary Examiner* — Hung Q Nguyen
*Assistant Examiner* — Mark L. Greene
(74) *Attorney, Agent, or Firm* — Brinks Gilson & Lione

(57) ABSTRACT

A system for inhibiting seizure of a bearing may include: a knocking sensor provided at one side of an engine to measure vibration transmitted from the engine and detect knocking of the engine, and a controller for controlling operation of the engine. In particular, the controller determines that a bearing of the engine is damaged when a magnitude of vibration of the engine inputted from the knocking sensor is greater than a damaged-bearing judging threshold value while the engine is operated in a damaged-bearing detecting region which is a region where knocking does not occur.

20 Claims, 7 Drawing Sheets

(56) References Cited

U.S. PATENT DOCUMENTS

| | | | |
|---|---|---|---|
| 2016/0377500 A1* | 12/2016 | Bizub | F02D 41/1497 |
| | | | 123/406.34 |
| 2016/0377506 A1* | 12/2016 | Bizub | G01H 1/006 |
| | | | 702/35 |
| 2019/0112952 A1* | 4/2019 | Bong | F01L 3/24 |
| 2019/0226416 A1* | 7/2019 | Zurlo | F02D 41/2422 |

* cited by examiner

SYSTEM AND METHOD FOR PREVENTING SEIZURE OF BEARING USING KNOCKING SENSOR

CROSS-REFERENCE TO RELATED APPLICATIONS

This application claims priority to and the benefit of Korean Patent Application No. 10-2018-0100513, filed on Aug. 27, 2018, the entire contents of which are incorporated herein by reference.

FIELD

The present disclosure relates to a system and a method for inhibiting or preventing seizure of a bearing using a knocking sensor.

BACKGROUND

The statements in this section merely provide background information related to the present disclosure and may not constitute prior art.

An engine of a vehicle is operated in a state where various components are coupled to each other, and a bearing is mounted on a portion at which components are coupled and operated, to reduce friction.

In FIG. 1A, a portion at which a connecting rod 11 and a crankshaft are coupled to each other is illustrated. A big end of the connecting rod 11 is coupled to a crankshaft to surround a crank pin 12, and a bearing 13 is provided between the big end of the connecting rod 11 and the crank pin 12. In addition, a gap between the big end of the connecting rod 11 and the crank pin 12 is filled with engine oil to reduce friction between the big end of the connecting rod 11 and the crank pin 12 when the engine is operated. In a normal state (see FIG. 1A), a gap between the bearing 13 and the crank pin 12 is small, and an oil film is formed between the bearing 13 and the crank pin 12 by the engine oil, so that noise and vibration are small.

However, we have discovered that when the engine is operated for a long period of time under abnormal conditions (e.g., foreign substance inflow, oil shortage, poor connecting rod journal machining state, etc.) (see FIG. 1B) and in a state where the bearing 13 is abraded and damaged, a gap G between the bearing 13 and the crank pin 12 is increased and noise and vibration are generated by a knock of the connecting rod 11 and the crank pin 12 during operation of the engine.

We have also discovered that when as illustrated in FIG. 1C, the bearing 13 has a seizure on the crank pin 12, and thus oil supply between the big end of the connecting rod 11 and the crank pin 12 is interrupted. When the engine is operated in a state where the bearing 13 is damaged on the connecting rod 11 as described above, seizure of the bearing is progressed and metal contact occurs on the bearing 13, the big end of the connecting rod 11 and the like, thereby generating noise and vibration beyond normal range. Also, the bearing 13 or the like is damaged.

We have discovered that when the bearing 13 is damaged, due to an increase in frictional resistance, a phenomenon of an engine stall a vehicle is generated. That is, when the bearing 13 is damaged, an output of the engine is reduced due to an increase in frictional resistance, and revolutions per minute (RPM) of the engine is increased when an accelerator pedal is operated to recover reduction of the output. However, an increase in the RPM of the engine repeats a vicious cycle in which the frictional resistance of the portion on which the bearing 13 is installed is increased again. At this time, the temperature of the friction portion is increased due to an increase of the frictional resistance, seizure is accelerated as the temperature of the bearing 13 is increased, and the components adjacent to the bearing 13, i.e., the connecting rod 11 and the crank pin 12 are also damaged, which causes damage to the engine.

When seizure of the bearing 13 occurs as described above, this leads to an overall problem of the engine and causes a problem such as engine stall. This cannot be solved only by repairing or replacing any one of the components, and the entire engine had to repaired or replaced.

SUMMARY

The present disclosure provides a system and a method for inhibiting or preventing seizure of a bearing using a knocking sensor, in which the knocking sensor detecting knocking of an engine detects a vibration of the engine in a region in which knocking (abnormal combustion, combustion knocking or pre-ignition) does not occur, thereby detecting damage to a bearing when the bearing is damaged in the engine and preventing the damaged bearing from being progressed to seizure.

Another form of the present disclosure is to provide a system and a method for inhibiting or preventing seizure of a bearing using a knocking sensor, which can detect damage to a bearing in advance and send a warning signal to a driver so that the driver can recognize damage to the bearing in advance to prevent seizure of the bearing and to allow the driver to repair a vehicle.

Further another form of the present disclosure is to provide a system and a method for inhibiting or preventing seizure of a bearing using a knocking sensor, which allows the engine to enter a limp home mode when damage to the bearing is detected.

In an exemplary form of the present disclosure, a system for inhibiting or preventing seizure of a bearing using a knocking sensor may include: a knocking sensor provided at one side of an engine and configured to measure vibration transmitted from the engine and detect knocking of the engine; and a controller configured to control operation of the engine and determine that a bearing of the engine is damaged when a magnitude of vibration of the engine inputted from the knocking sensor is greater than a damaged-bearing judging threshold value while the engine is operated in a damaged-bearing detecting region which is a region where knocking does not occur.

The controller may set the damaged-bearing detecting region based on revolutions per minute (RPM) of the engine and at least one of a load of the engine, an amount of air flowing into the engine or a throttle opening degree.

The controller may set a plurality of damaged-bearing detecting windows in which the RPM and the load of the engine are within a specified range, respectively, and set a threshold value for detecting damage to the bearing for each damaged-bearing detecting window.

When the cumulative number of times that the magnitude of the vibration of the engine measured by the knocking sensor is larger than the damaged-bearing determining threshold value is equal to or greater than the preset cumulative number of times within a preset cycle, the controller may determine that the bearing is damaged.

The controller determines whether the knocking sensor is in a normal state, and when the knocking sensor is in a normal state, the controller determines whether the bearing is damaged.

In one form, the system for inhibiting seizure of the bearing using the knocking sensor may further include a warning device configured to inform an occupant of damage to the bearing when the controller determines that the bearing is damaged.

The warning device may be a warning lamp provided on one side of an interior of a vehicle or a dashboard of the vehicle.

When it is determined that the bearing is damaged, the controller may control the engine to be operated at the preset safe maximum RPM or less so that damage to the bearing is not further progressed.

When it is determined that the bearing is damaged, the controller may control the engine to be operated at the preset minimum RPM that keeps an ignition so as to inhibit or prevent an engine stall.

The controller may signal-process knock sounds caused by knocking during combustion and by bearing seizure among the signals transmitted to the knocking sensor, using different frequency domain.

In another form, a method for inhibiting seizure of a bearing using a knocking sensor comprises: determining, by a controller, a damage to the bearing provided between a crankshaft and a connecting rod when a magnitude of a vibration measured by the knocking sensor mounted on an engine is larger than a preset damaged-bearing judging vibration magnitude while the engine is operated in a region where knocking does not occur.

In one form, the method may include determining whether the bearing is initiated to be damaged by detecting whether the magnitude of the vibration measured by the knocking sensor exceeds a preset magnitude while the engine is operated in the region where knocking does not occur; and determining that the bearing is damaged when the magnitude of the vibration measured by the knocking sensor repeatedly exceeds the preset magnitude The determining whether the bearing is initiated to be damaged may include determining whether the engine is being operated in a damaged-bearing detecting region where damage to the bearing is detected; and determining using the controller that the bearing is damaged, when the magnitude of the vibration measured by the knocking sensor is larger than a preset damaged-bearing judging threshold value at which the bearing is regarded as being damaged.

In judging whether the engine is being operated in the damaged-bearing detecting region, the damaged-bearing detecting region may be set based on the RPM of the engine and any one of a load of the engine, the amount of air entering the engine and a throttle opening degree.

In determining that the bearing is damaged, a plurality of damaged-bearing detecting windows in which the RPM and the load of the engine are within a specified range, respectively, may be set, and a threshold value for detecting damage to the bearing for each damaged-bearing detecting window may be set to determine damage to the bearing.

The method of present disclosure may further include checking the knocking sensor for judging whether the value outputted from the knocking sensor is in the range in which knocking of the engine is detected or includes abnormal signal other than the knocking signal. Here, when the value outputted from the knocking sensor is in the range where the knocking of the engine is detected and when the bearing is initiated to be damaged, the determining of damage to the bearing may be performed.

In determining whether the bearing is initiated to be damaged, the number of times that the magnitude of vibration measured by the knocking sensor exceeds the damaged-bearing judging threshold value may accumulated, and when the accumulated number of times exceeds preset number of times within a preset cycle, it may be determined that the bearing is damaged.

Checking the knocking sensor may include determining whether an output value of the knocking sensor enters a region in which the knocking sensor is monitored and determining using the controller whether there is an abnormality in the output value of the knocking sensor when the output value of the knocking sensor enters the region in which the knocking sensor is monitored.

The method of the present disclosure may further include operating a warning device provided in an interior of a vehicle for alerting an occupant of damage to the bearing when the bearing is damaged, after determining whether the bearing is initiated to be damaged.

The method of the present disclosure may further include performing a limp home mode for limiting the RPM of the engine to the preset safe maximum RPM or less after judging whether the bearing is initiated to be damaged.

In performing the limp home mode, the engine maintains the RPM which is equal to or larger than a preset minimum RPM that keeps an ignition.

In checking the knocking sensor, damage to the bearing is detected using different frequency domain when knock sounds caused by knocking during combustion and by bearing seizure are signal-processed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
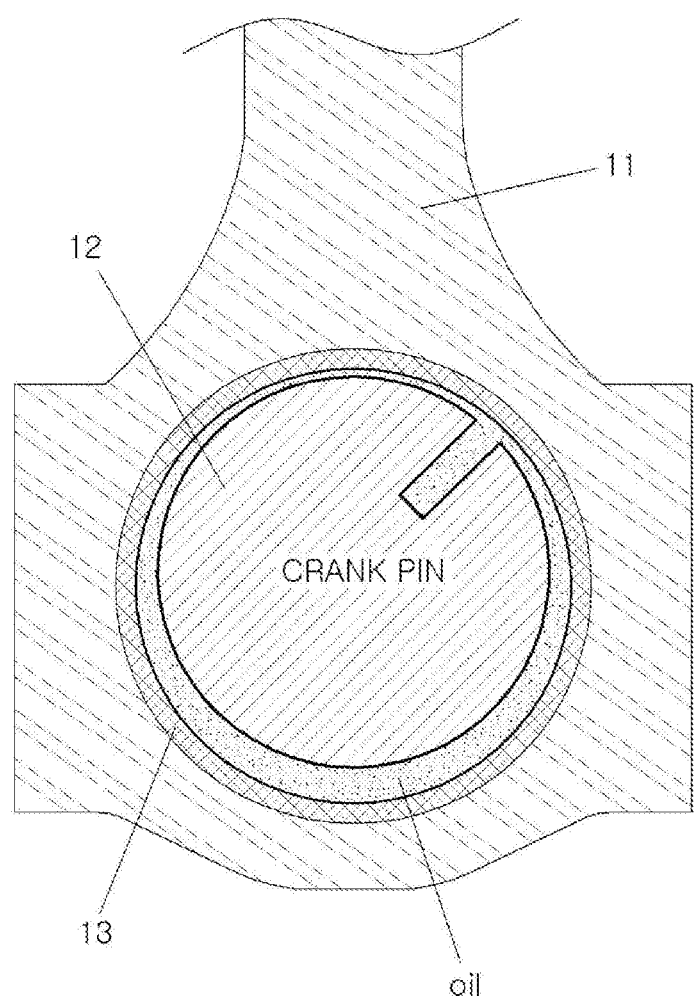
FIGS. 1A to 1C are cross-sectional views illustrating a process in which a bearing has a seizure at a region where a connecting rod and a crank pin are connected to each other in an engine.
Figure 1B:
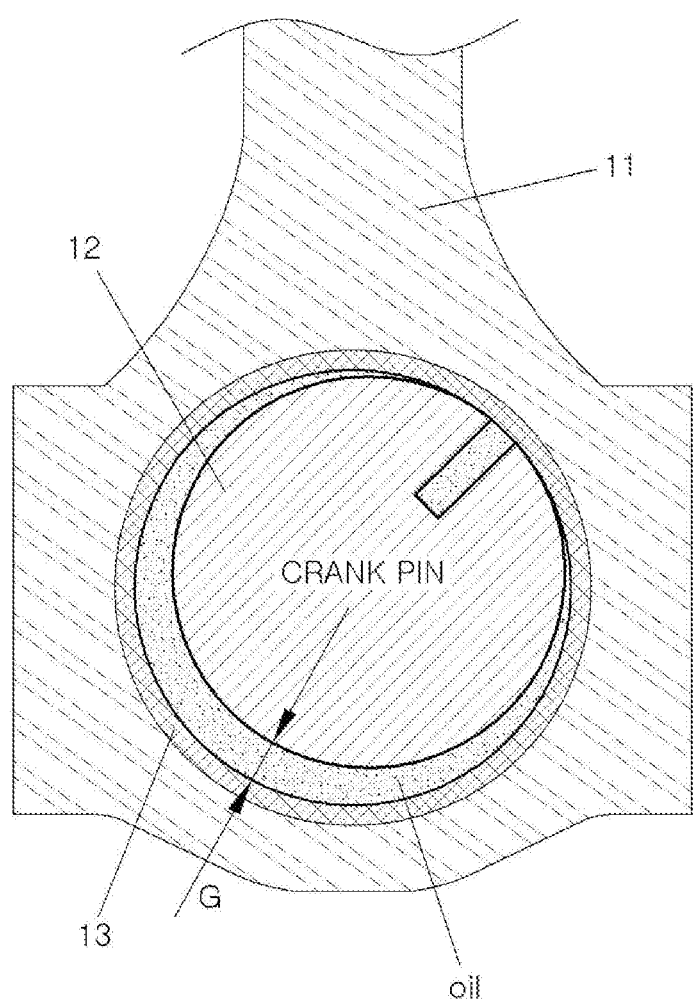
Figure 1C:
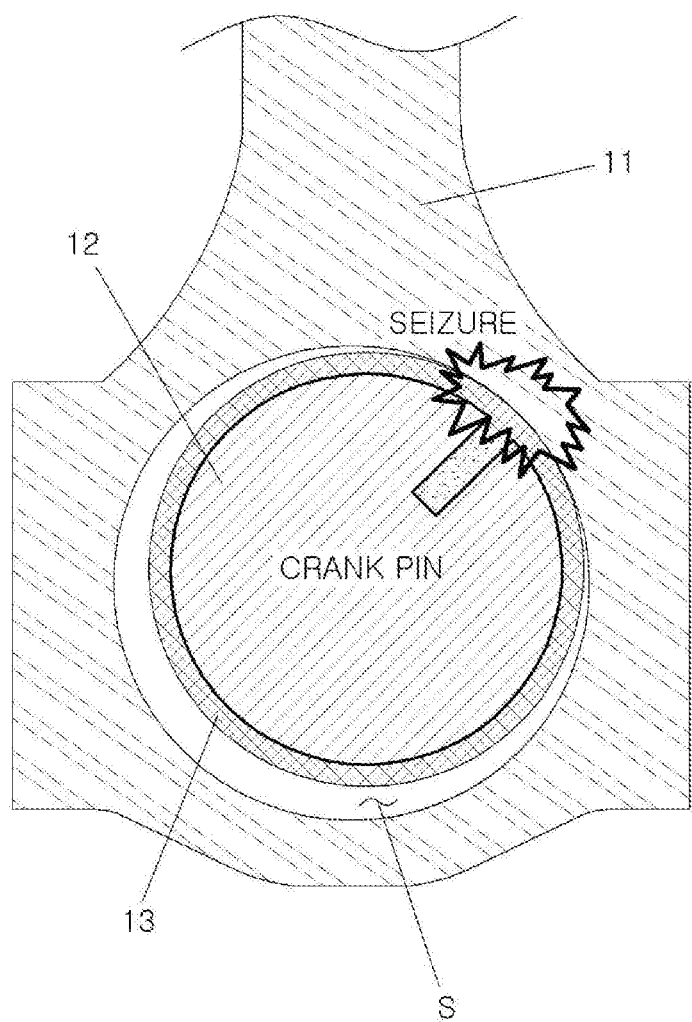
Figure 2:
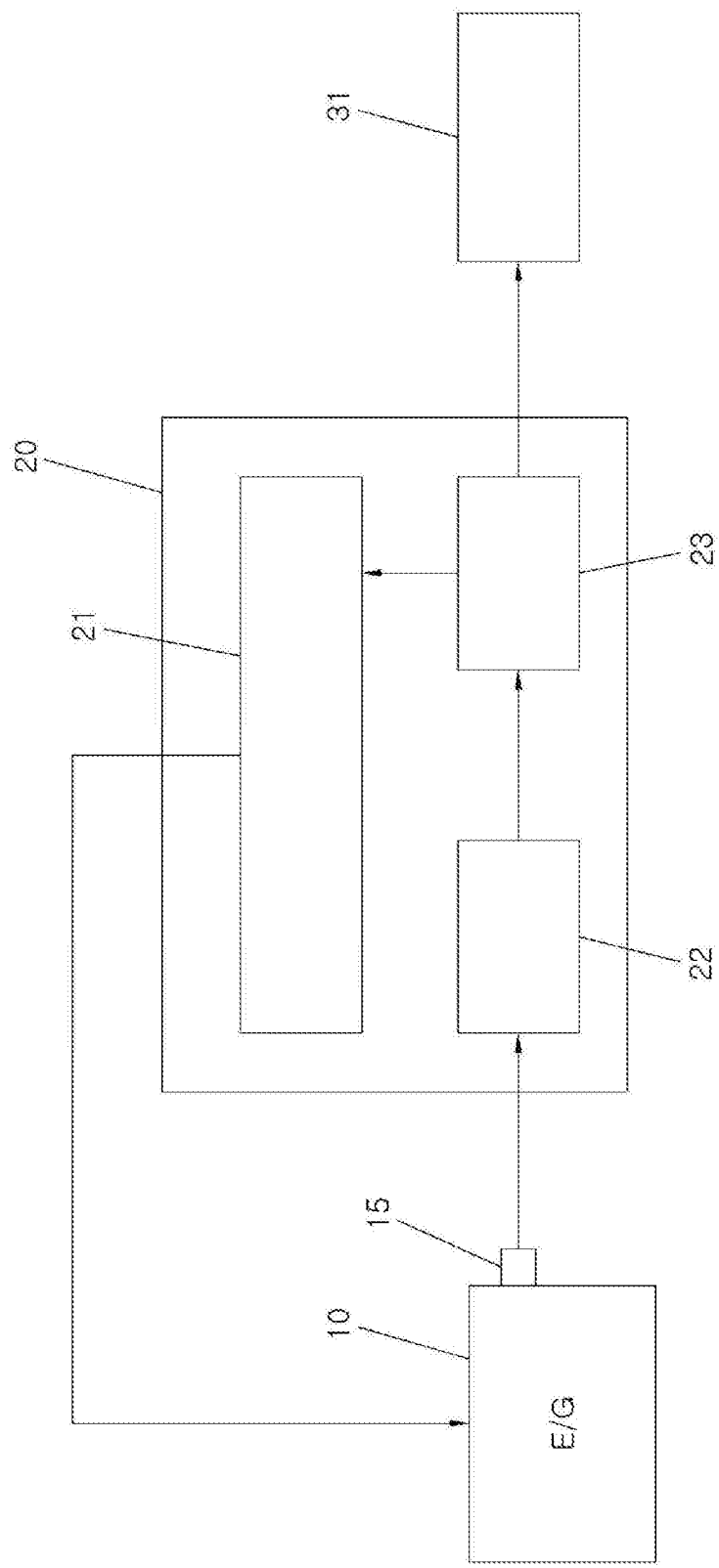
FIG. 2 is a block diagram illustrating a system for inhibiting or preventing a bearing seizure using a knocking sensor.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a system and method for inhibiting or preventing bearing seizure using a knocking sensor in an exemplary form of the present disclosure is described in detail with reference to the accompanying drawings.

In one form of the present disclosure, a system for inhibiting or preventing bearing seizure using a knocking sensor includes: a knocking sensor 15 installed at one side of an engine 10 for measuring vibration transmitted from the engine 10 to detect knocking of the engine, and a controller 20 provided for controlling operation of the engine 10 and judging that a bearing 13 of the engine 10 is damaged when a magnitude of vibration of the engine 10 inputted from the knocking sensor 15 is greater than a damaged-bearing judging threshold value while the engine 10 is operated in a damaged-bearing detecting region which is a region where knocking does not occur.

The knocking sensor 15 for detecting knocking using the vibration generated in the engine 10 when the engine 10 is operated is provided at one side of the engine 10.

Figure 4:
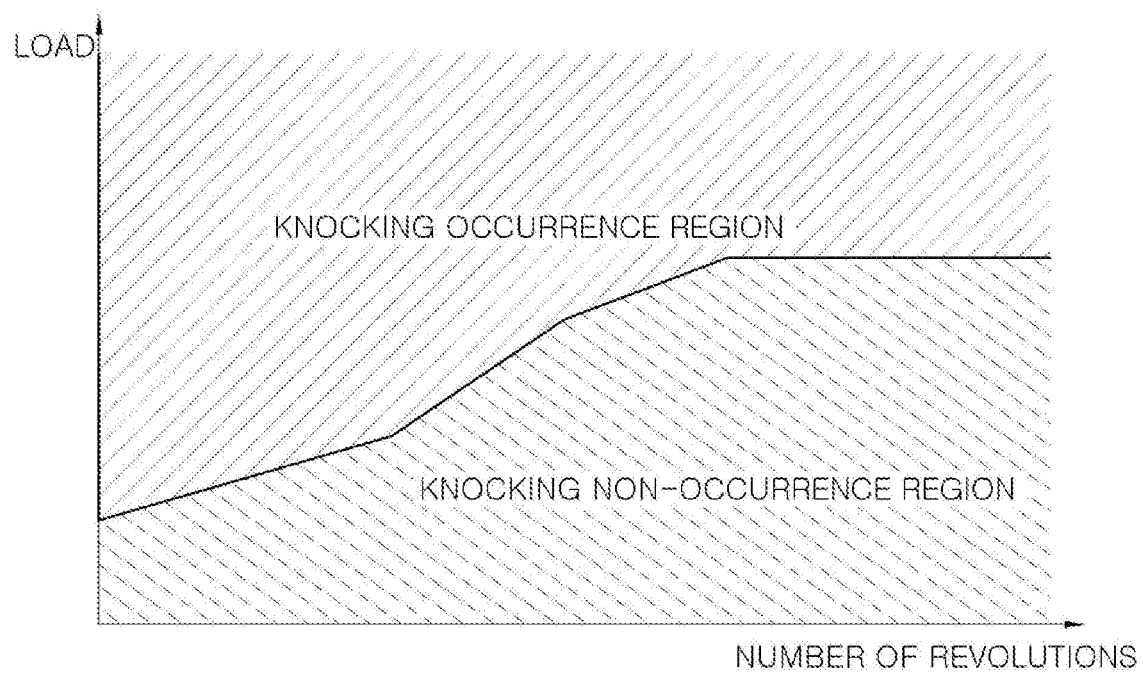
FIGS. 4 and 5 are graphs illustrating, in an operation region of an engine, a region where knocking occurs and a region where knocking does not occur.

The knocking sensor 15 usually detects knocking of the engine 10 using the vibration generated in the engine 10 when the engine 10 is operated in a region where knocking occurs. Since the engine 10 generates knocking at a curtain load or more in accordance with the RPM, the knocking sensor detects knocking using the magnitude of the vibration in a region where knocking can occur (a knocking occurrence region in FIG. 4) and does not detect knocking in the other region (a knocking non-occurrence region in FIG. 4). The knocking non-occurrence region is a region in which a load is low, and vibration caused by operating vibration of other machinery is greater than vibration caused by combustion. For this reason, knocking may be erroneously detected in the knocking non-occurrence region, so that knocking is not judged in the knocking non-occurrence region. If an ignition timing at which maximum braking torque (MBT) is generated is earlier than a knocking occurrence ignition timing (detonation boarder line: DBL) when the ignition timing is usually advanced, it can be regarded as the knocking non-occurrence region. The knocking occurrence region and the knocking non-occurrence region with respect to the relationship between the RPM of the engine 10 and the load may be shown in a graph as shown in FIG. 4. In addition, the controller 20 which will be described later analyzes the vibration inputted to the knocking sensor 15 in the knocking non-occurrence region to detect damage to the bearing 13. In other words, in the present disclosure, the knocking non-occurrence region becomes the damaged-bearing detecting region.

On the other hands, although it is possible to divide a region of operating of the engine into the knocking occurrence region and the knocking non-occurrence region (the damaged-bearing detecting region) based on the RPM and the load, the region of operating of the engine may be divided into the knocking occurrence region and the knocking non-occurrence region based on a relation between the RPM of the engine 10 and the amount of air flowing into the engine 10 or a relation between the RPM of the engine 10 and a throttle opening degree. That is, in the graph of FIG. 4, the air amount or the throttle opening degree may be the y-axis instead of the load.

Figure 5:
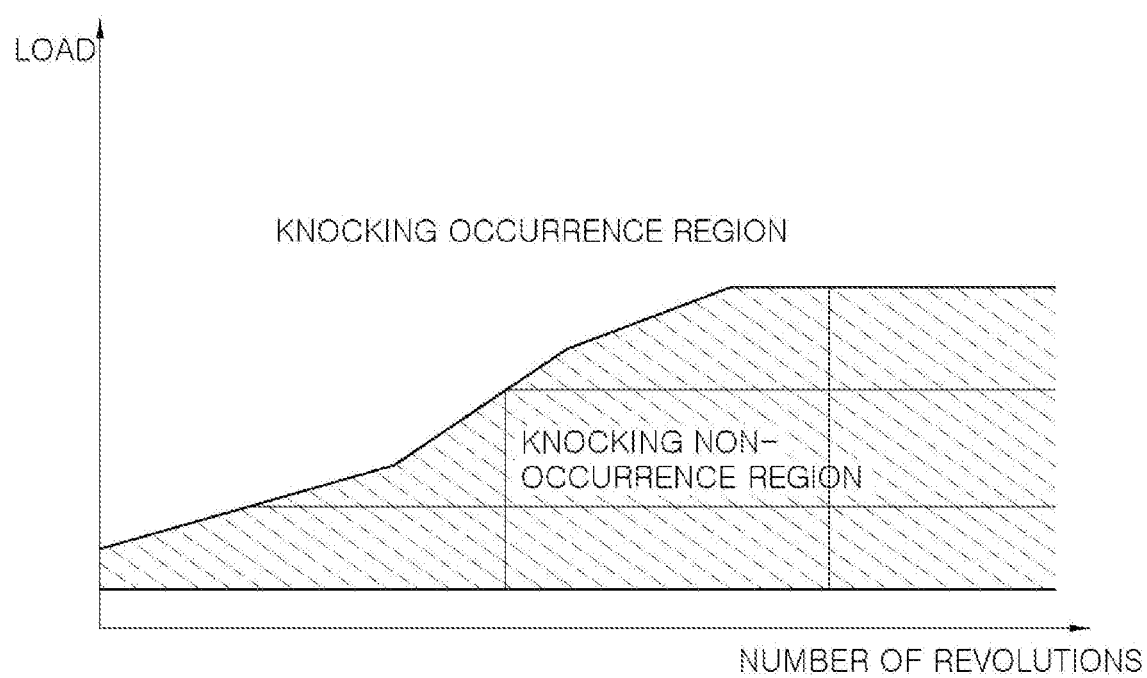

Further, just like a knocking detecting window is set to detect knocking when knocking of the engine 10 is detected by using the knocking sensor 15, even when damage to the bearing 13 is detected by the knocking sensor 15, as illustrated in FIG. 5, a plurality of damaged-bearing detecting windows may be set to detect damage to the bearing 13. Here, each of the window may be defined as a region in which the RPM and the load of the engine are within a specified range.

On the other hand, the damaged-bearing detecting window may be set differently from or the same as the knocking detecting window for detecting the knocking caused by combustion. When a crank angle at which the maximum vibration occurs is different, the damaged-bearing detecting window and the knocking detecting window may be set differently. However, a threshold value for detecting damage to the bearing and a threshold value for detecting knocking, which differ from each other, are applied in the damaged-bearing detecting window and the knocking detecting window, respectively. Also, the threshold values, which differ from each other, for detecting damage to the bearing 13 are applied for each damaged-bearing detecting window.

In one form, the one knocking sensor 15 is provided for the I-type four-cylinder engine 10 and two knocking sensors are provided for a V-type engine. At this time, on the basis of the crank angle of each cylinder, a vibration signal may be inputted with respect to the connecting rod bearing 13 of each cylinder. At this time, it is also possible to confirm which cylinder the bearings 13 is damaged by processing a signal inputted to the damaged-bearing detecting window according to a load of the RPM.

Generally, a noise is maximized when a contact surface between the connecting rod 11 and the crank pin 12 is changed before a top dead center (TDC), but it may be varied depending on characteristics of the engine. Therefore, when the crank angle at which the magnitude of vibration becomes maximum according to a rotation angle of the crankshaft is allocated for each cylinder, it is possible to grasp which cylinder the bearing 13 is damaged. Since positions at which the crankshaft and the connecting rod 11 generate knock sound are different according to a vibration transmission path of the vibration generated by damage to the bearing 13, the damaged-bearing detecting window can be divided and used for each cylinder.

However, although the cylinder in which the bearing 13 is damaged may be determined as described above, it is not necessary to grasp the cylinder in which the bearing is damaged. This is because, if the bearing 13 is damaged even in any one of the cylinders of the engine 10, since maintenance such as disassembly and replacement of the engine is desired, it is only desired to determine whether the bearing 13 is damaged.

The controller 20 controls combustion in the engine 10 according to a driver's operation and processes a signal inputted from the knocking sensor 15 to judge whether the connecting rod bearing 13 is damaged. For example, the controller 20 may include an engine controlling section 21 configured to control the combustion of the engine 10 according to the driver's operation, a signal input section 22 to which the signal from the knocking sensor 15 is inputted, and a damaged-bearing judging section 23 configured to judge damage to the bearing 13 using a signal inputted from the signal input section 22. A method for inhibiting or preventing bearing seizure using a knocking sensor, which will be described later, is stored in the controller 20 as a logic, so that the method for inhibiting or preventing bearing seizure using the knocking sensor is performed by the controller 20. The controller may be implemented by at least one processor operated by a setting program, in which the setting program includes a series of commands for performing each step included in the method for inhibiting or preventing bearing seizure using the knocking sensor according to the present disclosure to be described below.

The engine controlling section 21 may control combustion in the engine 10 to allow the engine 10 to generate a desired torque according to the driver's operation, a travelling state of a vehicle, and the like. Since the control of the engine 10 performed by the engine controlling section 21 (e.g., an engine control unit) corresponds to a conventional control of the engine 10, a detailed description thereon will be omitted.

The signal input section 22 receives the signal outputted from the knocking sensor 15. The controller 20 processes the signal inputted to the signal input section 22 to detect damage to the bearing 13.

The damaged-bearing judging section 23 judges whether the engine 10 is being operated in the knocking non-occurrence region according to the load and the RPM of the engine 10 acquired from the engine controlling section 21, and when the engine 10 is being operated in the knocking non-occurrence region, the damaged-bearing judging section judges whether the bearing 13 is damaged by using the vibration inputted through the knocking sensor 15. The damaged-bearing judging section 23 provisionally determines that the bearing 13 is damaged when the magnitude of vibration inputted to the knocking sensor 15 is greater than the damaged-bearing judging threshold value. In addition, the number of times that the magnitude of vibration measured by the knocking sensor 15 exceeds the damaged-bearing judging threshold value is accumulated and when the accumulated number of times exceeds a predetermined number of times within a preset cycle, the damaged-bearing judging section determines that the bearing 13 is damaged. The method for preventing bearing seizure using the knocking sensor, which will be described later, is substantially performed in damaged-bearing judging section 23 to judge whether the bearing 13 is damaged.

Meanwhile, when the damaged-bearing judging section 23 judges that the bearing 13 is damaged, the engine controlling section 21 allows the engine 10 to be operated in a limp home mode. Since damage is rapidly progressed when the bearing 13 is initiated to be damaged, in order to inhibit or prevent further damage, the engine controlling section 21 controls the engine 10 to be operated with the RPM equal to or less than the preset safe maximum RPM. In addition, in order to prevent an ignition of the engine 10 from being turned off, the engine controlling section 21 controls operation of the engine 10 with the preset minimum RPM that can keep the ignition. At this time, when the damaged-bearing judging section 23 judges that the magnitude of vibration inputted from the knocking sensor 15 exceeds the damaged-bearing judging threshold value even once, the engine controlling section 21 allows the engine to enter the limp home mode.

A warning means may alert an occupant to recognize damage to the bearing 13 when the controller 20 judges that the bearing 13 is damaged.

For example, a warning lamp 31 installed in an interior or on a dashboard of the vehicle may be employed as the warning means.

When damage to the bearing 13 is detected, the controller 20 may turn on the warning lamp 31 to allow the occupant to recognize damage to the bearing 13.

On the other hand, a speaker installed at one side of the interior of the vehicle may be employed as another example of the warning means. When damage to bearing 13 is detected, the speaker may generate a warning sound to allow the occupant to recognize damage to the bearing 13.

When it is judged that the magnitude of vibration exceeds the damaged-bearing judging condition even once, the warning means is also operated.

Figure 3:
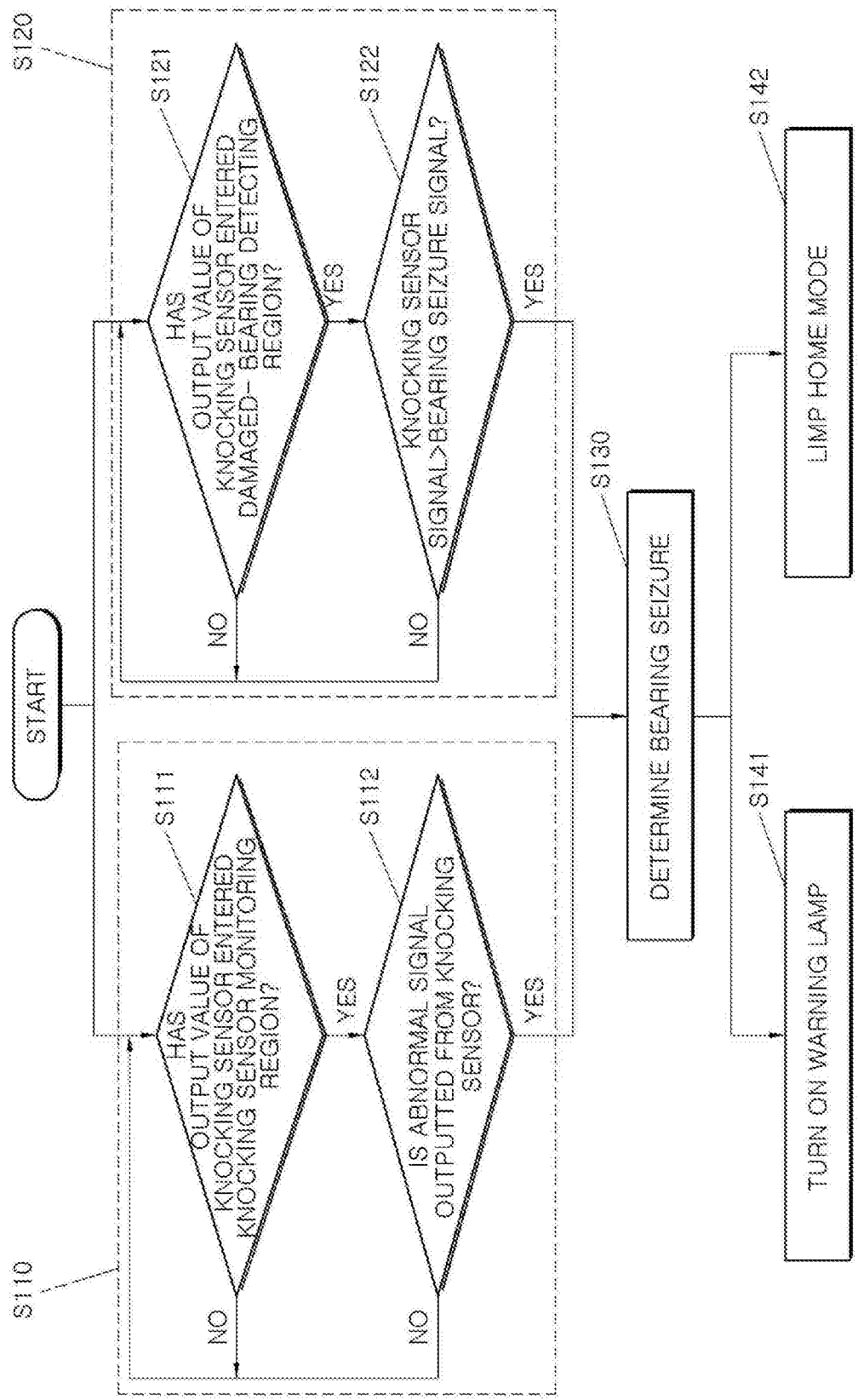
FIG. 3 is a flowchart illustrating a method for inhibiting or preventing a bearing seizure using a knocking sensor.

Hereinafter, the method for preventing bearing seizure using the knocking sensor according to the present disclosure is described with reference to FIG. 3.

The method for inhibiting or preventing bearing seizure using the knocking sensor according to the present disclosure is performed by the above-described system for preventing bearing seizure using the knocking sensor, and when it is judged that the magnitude of vibration inputted to the knocking sensor 15 mounted on the engine 10 is greater than magnitude of a preset damaged-bearing judging vibration while the engine 10 is being operated in the region where knocking does not occur, it is judged that the bearing 13 provided between the crankshaft and the connecting rod 11 is damaged.

In the present disclosure, in a state in which the knocking sensor 15 is being normally operated, if the vibration greater than the damaged-bearing judging threshold value is inputted from the knocking sensor 15 when the engine 10 is operated in the knocking non-occurrence region, it is judged that the bearing is damaged.

In a knocking sensor checking step S110, it is judged whether a value outputted from the knocking sensor 15 is within a range in which knocking of the engine 10 is detected and whether an abnormal signal such as damage to the bearing is inputted. When the bearing is damaged, the knocking sensor receives knock signals, which are caused by the damaged bearing, from both a region where combustion knocking occurs and a region where combustion knocking does not occur, and the knocking sensor checking step S110 is performed to inhibit or prevent the bearing from being erroneously judged as being damaged on the basis of only the signal in the damaged-bearing detecting region. Since, in the knocking sensor checking step S110, it is judged whether the knocking sensor 15 is being normally operated, it is possible to reduce an error occurred when the damaged bearing 13 is detected only by the damaged-bearing judging step S120 which will be described later. That is, in a case where when the signal of the knocking sensor, which has the maximum value or a value equal to or more than a certain value, is continuously generated due to the damaged bearing, the vibration is judged as abnormal vibration such as unusual vibration caused by the bearing, rather than combustion knocking, in a case where it is judged that abnormal signal other than combustion knocking is inputted into the knocking sensor when the knocking signal with the same level is continuously generated even if an ignition retardation is made according to a judgement that knocking occurs in the combustion knocking region, or in a case where abnormal signal is continuously generated at a specific frequency which differs from combustion knocking detection frequency and is generated caused by the damaged bearing, a logic configured to detect the damaged bearing is allowed to be performed.

To this end, the knocking sensor checking step S110 includes a knocking sensor monitoring region entrance judging step S111 for judging whether the output value of the knocking sensor 15 has entered a region in which the knocking sensor 15 is monitored, and a knocking sensor signal checking step S112 for judging whether there is an abnormal signal, such as damage to the bearing, in the output value of the knocking sensor 15 when the output value of the knocking sensor 15 has entered the region in which the knocking sensor 15 is monitored.

The knocking sensor monitoring region entrance judging step S111 judges whether the output value of the knocking sensor 15 is in the region in which the knocking sensor 15 is monitored to proceed a subsequent step when the output value of the knocking sensor 15, which is greater than a general knocking sensor signal, is repeatedly inputted certain number of times, when the signal is not returned to the normal level under the same conditions even though the ignition retardation occurs due to knocking detection, or when an abnormal signal occurs in the frequency domain which differs from that of combustion knocking. When damage to the bearing 13 occurs, vibration is transmitted from both the region on which combustion knocking occurs and the region where no combustion knocking occurs to the knocking sensor 15. In order to distinguish between knocking caused by combustion in the knocking occurrence region and signal increase caused by the damaged bearing, a frequency of knocking caused by combustion is employed as a specific frequency matching to inherent characteristic of the engine, a frequency that best represents vibration characteristics caused by the damaged bearing is selected in frequencies other than frequency domain caused by combustion knocking, and it is possible to detect the damaged bearing at this frequency. By using the above, it is possible to detect the damaged bearing without being confused with combustion knocking even in the region where combustion knocking occurs. This is one of the method for detecting the damaged bearing in the region where combustion knocking do not occur as well as the method for distinguishing whether the increase in the signal outputted from the knocking sensor 15 is caused by combustion knocking or the damaged bearing.

The knocking sensor signal checking step S112 judges whether an abnormal signal other than combustion knocking is inputted from the knocking sensor 15 to the controller 20. That is, the knocking sensor signal checking step S112 judges that an abnormal signal caused by external noise such as the damaged bearing is being inputted when the maximum value or calibration value of the output value of the knocking sensor 15 is equal to or greater than a preset value.

In the knocking sensor signal checking step S112, it is judged whether the abnormal signal such as the damaged bearing is inputted to the signal of the knocking sensor 15, and damage to the bearing 13 is detected by using the knocking sensor 15 only when the signal of the knocking sensor 15 is not normal.

On the other hand, when the conditions of the knocking sensor monitoring region entrance judging step S111 and the knocking sensor signal checking step S112 are not satisfied, a procedure is returned to an initial step. That is, when the output value of the knocking sensor 15 is in a range in which the knocking sensor 15 is not monitored or when it is judged in the knocking sensor signal checking step S112 that there is no abnormal signal such as damage to the bearing in the output value of the knocking sensor 15, the procedure is returned to the initial step.

As a method for preventing erroneous detection for the damaged bearing, on the other hand, if it is possible to clearly judge whether the damaged bearing is clearly detected by the signal in the damaged-bearing detecting region (the region where knocking caused by combustion does not occur), the knocking sensor signal checking step S112 may be omitted.

The damaged-bearing judging step S120 employs the output value of the knocking sensor 15 to judge whether the bearing is damaged.

To this end, the damaged-bearing judging step S120 includes a damaged-bearing detecting region entrance judging step S121 for judging whether the output value of the knocking sensor 15 is in the region where damage to the bearing 13 is detected, and a damaged-bearing determining step S122 for determining that the bearing 13 is damaged when the output value of the sensor 15 is greater than a signal value which is preset as meaning that the bearing 13 is damaged.

The damaged-bearing detecting region entrance judging step S121 judges whether the engine 10 is being operated in the damaged-bearing detecting region on the basis of a relation of the load with respect to the RPM.

Since the engine 10 generates knocking at a certain load or more according to the RPM, knocking is detected with the magnitude of vibration in the region where knocking can occur (the knocking occurrence region in FIG. 4) and is not detected in the region (the knocking non-occurrence region in FIG. 4) below the above region. This may be shown in FIG. 4 as a graph, the knocking non-occurrence region where nocking is not detected is defined as the damaged-bearing detecting region, and damage to the bearing 13 is detected by analyzing the vibration inputted to the knocking sensor 15.

In the damaged-bearing detecting region entrance judging step S121, accordingly, it is judged whether the engine 10 is being operated in the knocking non-occurrence region, that is, the damaged-bearing detecting region.

On the other hand, although according to a relation between the RPM and the load, the region of operating of the engine may be divided into the knocking occurrence region and the knocking non-occurrence region (the damaged-bearing detecting region), the region of operating of the engine may be divided into the knocking occurrence region and the knocking non-occurrence area according to a relation between the RPM of the engine 10 and the amount of air entering the engine 10 or a relation between the RPM and the throttle opening degree of the engine 10.

The damaged-bearing determining step S122 determines that the bearing is damaged when the signal outputted from the knocking sensor 15, that is, the magnitude of vibration satisfies a preset damaged-bearing judging condition while the engine 10 is being operated in the knocking non-occurrence region. Here, the damaged-bearing judging condition is a case where the magnitude of vibration measured by the knocking sensor 15 repeatedly exceeds the threshold value certain number of times.

That is, the number of times that the output value of the knocking sensor 15 is greater than the damaged-bearing judging threshold value is cumulatively counted, and when the accumulated number of times exceeds certain number of times of damaged-bearing determination within a predetermined cycle, the bearing 13 is determined to be damaged.

Just like the knocking detecting window is set to detect knocking when knocking of the engine 10 is detected, even when damage to the bearing 13 is detected, the damaged-bearing detecting window may be set to detect damage to the bearing 13.

Meanwhile, the damaged-bearing detecting window may be set differently from or the same as the knocking detecting window for detecting knocking caused by combustion. When a crank angle at which the maximum vibration occurs is different, the damaged-bearing detecting window and the knocking detecting window may be set differently. However, a threshold value for detecting damage to the bearing and a threshold value for detecting knocking, which differ from each other, are applied in the damaged-bearing detecting window and the knocking detecting window, respectively.

The one knocking sensor 15 is provided in the four-cylinder engine 10. At this time, on the basis of the crank angle of each cylinder, the vibration signal may be inputted with respect to the connecting rod bearing 13 of each cylinder. At this time, it is also possible to confirm which cylinder the bearings 13 is damaged by processing a signal inputted to the damaged-bearing detecting window according to a load of the RPM.

Generally, a noise is maximized when the contact surface between the connecting rod 11 and the crank pin 12 is changed before the top dead center (TDC). Therefore, when the crank angle at which the magnitude of vibration becomes maximum according to a rotation angle of the crankshaft is allocated for each cylinder, it is possible to grasp which cylinder the bearing 13 is damaged. Since positions at which the crankshaft and the connecting rod 11 generate knock sound are different according to a vibration transmission path of the vibration generated by damage to the bearing 13, the damaged-bearing detecting window can be divided and used for each cylinder.

Since knock sounds of the connecting rod 11 and the crank pin 12 generated by the damaged bearing have various frequencies, one of them may be set differently from frequency of knocking generated by combustion.

When any of the damaged-bearing detecting region entrance judging step S121 and the damaged-bearing determining step S122 is not satisfied, the procedure is returned to the initial step. That is, when the operation range of the engine 10 is not the damaged-bearing detecting region or when the magnitude of vibration inputted from the knocking sensor 15 is not greater than the damaged-bearing judging threshold value, the procedure is returned to a point before the damaged-bearing detecting region entrance judging step S121. However, when it is possible to clearly make a judgment only by the damaged-bearing determining step S122, the damaged-bearing detecting region entrance judging step S121 may not be performed.

Meanwhile, the knocking sensor checking step S110 and the damaged-bearing judging step S120 may be simultaneously performed. In one form, a damaged-bearing determining step S130 described below may be performed only when all of the knocking sensor checking step S110 and the damaged-bearing judging step S120 are satisfied. However, the knocking sensor checking step S110 may not be performed when the damaged bearing is clearly judged only by the damaged-bearing judging step S120.

Meanwhile, any one the knocking sensor checking step S110 and the damaged-bearing judging step S120 may be performed first, and the other one may be performed later. Also in this case, the damaged-bearing determining step S130 is performed when all of the knocking sensor checking step S110 and the damaged-bearing judging step S120 are satisfied.

In addition, as described above, it is possible to detect damage to the bearing 13 by performing only the damaged-bearing judging step S120 without performing the knocking sensor checking step S110. However, since it is not judged whether the knocking sensor 15 is normal or not, there is a possibility that an error occurs when damage to the bearing 13 is judged. Accordingly, all of the knocking sensor checking step S110 and the damaged-bearing judging step S120 may be performed.

In addition, when the signal value of the knock sensor 15 is continuously generated in the knocking sensor checking step S110 even if the ignition retardation occurs at a level at which the nocking does not occur, the damaged-bearing determining step S130 may be immediately performed.

When it is judged in the damaged-bearing judging step S120 that the bearing 13 is damaged while the condition in the knocking sensor checking step S110 is satisfied, it is determined in the damaged-bearing determining step S130 that the bearing 130 is damaged.

When it is determined in the damaged-bearing determining step S130 that the bearing 13 is damaged, the warning means installed in the vehicle is operated in a warning means operating step S141 so that the occupant may recognize the damaged bearing. For example, a warning lamp is installed on one side of the interior or the dashboard of vehicle, and the warning lamp 31 is turned on so that the occupant recognizes damage to the bearing 13. Meanwhile, in the warning means operating step S141, it is possible to notify the occupant of damage to the bearing by not only turning on the warning lamp 31 but also warning sound or vibration, thereby preventing damage to the bearing from proceeding to seizure of the bearing.

In particular, even when the magnitude of vibration measured by the knocking sensor 15 exceeds the damaged-bearing judging threshold value only once in the damaged-bearing determining step 122, it is possible to operate the warning means in the warning means operating step S141. When the magnitude of vibration exceeds the damaged-bearing judging threshold value only once in the damaged-bearing determining step 122, the warning means is allowed to be immediately operated without an additional procedure such as turning on or off the ignition. This is to prevent further damage to the bearing since damage is rapidly progressed when the bearing 13 is damaged.

The engine 10 is operated at the preset safe maximum RPM or less in a limp home mode step S142 so that the bearing 13 is not further progressed to a seizure state when it is determined in the damaged-bearing determining step S130 that the bearing 13 is damaged.

In the limp home mode step S142, furthermore, the engine 10 is operated at the preset minimum RPM that keeps the ignition, so that the ignition of engine 10 may be maintained.

When the bearing is damaged, the vehicle is allowed to be traveled in a state where the output is limited and the ignition of engine is maintained through the limp home mode step S142, so that the vehicle may be traveled to a place where the vehicle may be repaired.

Meanwhile, even when the magnitude of vibration measured by the knocking sensor 15 exceeds the damaged-bearing judging condition (for example, the magnitude exceeds determined magnitude and the accumulated number of times exceeds certain number of times) only once, the limp home mode step S142 is allowed to be performed.

The system and the method for preventing seizure of the bearing using the knocking sensor according to the present disclosure having the above described configuration employs the knocking sensor to detect damage to the bearing in the region in which knocking does not occurs, so that it is possible to prevent seizure of the bearing in advance.

In the system and method of the present disclosure, when damage to the bearing is detected, the warning means alerts a driver to damage to the bearing and enables the drive to repair the engine.

In addition, when damage to the bearing is detected, the system and method of the present disclosure allow the engine to enter in the limp home mode to limit the RPM of the engine, whereby it is possible to prevent the damaged bearing from being further progressed to seizure and engine stall is prevented to allow the vehicle to be traveled to a safety zone or a garage.

Although the present disclosure has been described with a focus on novel features of the present disclosure applied to various forms, it will be apparent to those skilled in the art that various deletions, substitutions, and changes in the form and details of the apparatus and method described above may be made without departing from the scope of the present disclosure. All modifications within the equivalent scope of the present disclosure are embraced within the scope of the present disclosure.

What is claimed is:

1. A system for inhibiting seizure of a bearing, comprising:
   a knocking sensor provided at one side of an engine and configured to measure vibration transmitted from the engine and to detect knocking of the engine; and
   a controller configured to control operation of the engine and to determine that a bearing of the engine is damaged when a magnitude of the vibration of the engine inputted from the knocking sensor is greater than a damaged-bearing judging threshold value while the engine is operated in a damaged-bearing detecting region which is a region where knocking does not occur.

2. The system of claim 1, wherein the controller is configured to set the damaged-bearing detecting region based on revolutions per minute (RPM) of the engine and at least one of a load of the engine, an amount of air flowing into the engine or a throttle opening degree.

3. The system of claim 1, wherein the controller is configured to set a plurality of damaged-bearing detecting windows in which the revolutions per minute (RPM) of the engine and the load of the engine are within a predetermined range, respectively, and configured to set a damaged-bearing judging threshold value for detecting damage to the bearing for each of the damaged bearing detecting windows of the plurality of damaged-bearing detecting windows.

4. The system of claim 1, wherein when a cumulative number of times that the magnitude of the vibration of the engine measured by the knocking sensor is larger than the damaged-bearing determining threshold value is equal to or greater than a predetermined cumulative number of times within a preset cycle, the controller determines that the bearing is damaged.

5. The system of claim 1, wherein when the controller determines that an abnormal signal is transmitted to the knocking sensor, and when the knocking sensor senses a signal other than knocking caused by combustion, the controller is configured to determine that that the bearing is damaged.

6. The system of claim 1, further comprising a warning means configured to inform an occupant of damage to the bearing when the controller determines that the bearing is damaged.

7. The system of claim 1, wherein when the damage to the bearing is determined, the controller is configured to control the engine to be operated at a first preset safe revolutions per minute (RPM) or less so that the damage to the bearing is not further progressed.

8. The system of claim 1, wherein when the damage to the bearing is determined, the controller is configured to control the engine to be operated at a second preset revolutions per minute (RPM) that keeps an ignition so as to inhibit an engine stall.

9. The system of claim 1, wherein the controller is configured to use different frequency domain and process knock sounds caused by the knocking during combustion and by the bearing seizure among signals transmitted to the knocking sensor.

10. A method for inhibiting seizure of a bearing using a knocking sensor, the method comprising:
    determining, by a controller, a damage to the bearing provided between a crankshaft and a connecting rod when a magnitude of a vibration measured by the knocking sensor mounted on an engine is greater than a preset damaged-bearing judging vibration magnitude while the engine is operated in a region where knocking does not occur.

11. The method of claim 10, wherein the method further comprises:
    determining, by the controller, whether the bearing is initiated to be damaged by detecting whether the magnitude of the vibration measured by the knocking sensor exceeds a preset magnitude while the engine is operated in the region where knocking does not occur; and
    determining, by the controller, that the bearing is damaged when the magnitude of the vibration measured by the knocking sensor repeatedly exceeds the preset magnitude.

12. The method of claim 11, wherein determining whether the bearing is initiated to be damaged comprises:
    determining, by the controller, whether the engine is operated in a damaged-bearing detecting region where damage to the bearing is detected; and
    determining, using the controller, that the bearing is damaged when the magnitude of the vibration measured by the knocking sensor is greater than a preset damaged-bearing judging threshold value at which the bearing is regarded as being damaged.

13. The method of claim 12, wherein, in determining whether the engine is operated in the damaged-bearing detecting region, the damaged-bearing detecting region is set based on revolutions per minute (RPM) of the engine and at least one of a load of the engine, an amount of air entering to the engine or a throttle opening degree.

14. The method of claim 12, wherein, in determining damage to the bearing, a plurality of damaged-bearing detecting windows in which revolutions per minute (RPM) and a load of the engine are within a predetermined range are respectively set, and a threshold value for detecting damage to the bearing for each damaged-bearing detecting window of the plurality of damaged-bearing detecting windows is set to determine damage to the bearing.

15. The method of claim 12, wherein, in determining whether the bearing is initiated to be damaged, a number of times that the magnitude of vibration measured by the knocking sensor exceeds the preset damaged-bearing judging threshold value is accumulated, and when the accumulated number of times exceeds a preset number of times within a preset cycle, the damage to the bearing is determined.

16. The method of claim 11, further comprising:
    checking the knocking sensor, by the controller, whether a value outputted from the knocking sensor is in a range in which knocking of the engine is detected or includes an abnormal signal other than a knocking signal,
    wherein when the value outputted from the knocking sensor is in the range where the knocking of the engine is detected and when the bearing is initiated to be damaged, the determining of the damage to the bearing is performed.

17. The method of claim 16, wherein checking the knocking sensor comprises:
- determining, by the controller, whether the value outputted from the knocking sensor enters a region in which the knocking sensor is monitored; and
- determining, by the controller, an abnormality in the output value of the knocking sensor when the output value of the knocking sensor enters the region in which the knocking sensor is monitored.

18. The method of claim 16, wherein, in checking the knocking sensor, damage to the bearing is detected using different frequency domain when knock sounds caused by knocking during combustion and by bearing seizure are signal-processed.

19. The method of claim 11, further comprising operating, using the controller, a warning device provided in an interior of a vehicle, the warning device configured to alert an occupant of the damage to the bearing, after determining whether the bearing is initiated to be damaged.

20. The method of claim 11, further comprising performing, using the controller, a limp home mode for limiting revolutions per minute (RPM) of the engine to a first preset safe RPM or less after determining whether the bearing is initiated to be damaged.

* * * * *